Patented Apr. 6, 1954

2,674,572

UNITED STATES PATENT OFFICE 2,674,572

PRODUCTION OF TETRACHLORO-CYCLOHEXANONES

Wolfgang Gündel, Dusseldorf-Oberkassel, and Werner Scherff, Hilden, Germany, assignors to Henkel & Cie, G. m. b. H., Dusseldorf-Holthausen, Germany No Drawing. Application February 17, 1951, Serial No. 211,568

Claims priority, application Germany February 18, 1950

1 Claim. (Cl. 204—158)

This invention relates to new chemical compounds, i. e. tetrachloro-cyclohexanone and its substitutes. Furthermore, the invention relates to processes for the production of said new chemical compounds.

It is a fact known in the art that crystallized tetrabromo-cyclohexanone may be obtained by bromiding cyclohexanone or cyclohexanol.

This product has a melting point of 119–120° C. It is unstable, and, even when kept in the dark, suffers decomposition already at room-temperature.

At higher temperatures, e. g. 120–130° C., the decomposition is complete. Hydrogen bromide and 2.6 dibromophenol is formed thereby, from which it may be concluded that this tetrabromo compound is the 2,2,6, 6-tetrabromo-cyclohexanone.

If cyclohexanone and cyclohexanol are chlorinated, the conditions are even more unfavorable because of the special sensitivity of these compounds, in particular of the cyclohexanone, to hydrochloric acid.

In order to avoid the danger of extensive gumming, which is particularly present when using cyclohexanone as primary material, all experts have carried out the chlorination of this compound in the presence of water and chalk as acid-binding material. Thereby only the 2-chloro-cyclohexanone was obtained as defined material and even this in useful quantities only when very special reaction-conditions were maintained. Insofar as, in addition to the 2-chloro-cyclohexanone, a fraction of "multiple substituted cyclohexanones" was obtained, they were described as bodies, which on standing decomposes with the formation of the simple chlorinated ketone.

It was discovered that a hitherto unknown, under certain circumstances substituted, tetrachloro-cyclohexanone can be obtained in a simple manner by chlorinating cyclohexanol, also in an organic solvent, under the influence of actinic irradiation and advantageously in the presence of suitable catalyzers, such as organic peroxide at temperatures under 100°, preferably between 20 and 80° C. For the actinic irradiation, ultra-violet light is particularly suitable as are also the rays produced by dark electric discharges.

Under the conditions described, no gummy by-products are formed and the achievable yields are, without difficulty, above 60% of the theoretical amount. Insofar as no solvents are used, the tetrachloro-cyclohexanone formed crystallizes out of the chlorination mixture. It most probably possesses the constitution of a 2,2,6,6-tetrachloro-cyclohexanone. It is a colorless compound which may be re-crystallized from benzene, with a melting point of 82–83°, which, in pure condition, has an hardly appreciable odor and, contrary to the known tetrabromo-compound and the higher chlorinated cyclohexanone isolated hitherto, may be kept indefinitely. It is also considerably less susceptible to thermic influences than the compounds mentioned.

The procedure described for the production of defined chlorination products is capable of general application. For instance, in place of cyclohexanol, 4-methyl-cyclohexanol may be used as a starting product. 4-methyl-tetrachloro-cyclohexanone is then obtained in an oily form.

The permanent chlorination products produceable in this manner possess insecticidal qualities.

Example 1

100 parts by weight of cyclohexanol, after the addition of 2 parts by weight of benzoylperoxide, are chlorinated, first at room temperature and later at a temperature of 30–60° C., with simultaneous irradiation by means of an ultra-violet lamp, until the first crystals of the resulting tetrachloro-cyclohexanone begin to crystallize out of the reaction mixture. After cooling to 0°, the plentifully precipitated crystals are isolated, and, if required, purified by recrystallization from light benzene. 155 parts by weight of tetrachloro-cyclohexanone with a melting point of 82–83° are obtained. Further portions may be obtained by additional chlorination and renewed freezing-out.

Example 2

114 parts by weight of 4-methyl-cyclohexanol are chlorinated in the presence of 2.2 parts by weight of benzoylperoxide and irradiated with a quartz lamp at a temperature of 20–50° until the weight increment corresponds to the addition of 4 chlorine atoms. After removal of the hydrochloric acid dissolved in the mass, the distillation product is distilled under reduced pressure and there is obtained as chief fraction an oil boiling at $Kp_2 = 110$–$113°$ C., which, according to its elemental composition proves to be the corresponding tetrachloro-4-methylcyclohexanone.

We claim:

3

A process of producing a tetrachloro-cyclohexanone, which comprises subjecting a compound selected from the group consisting of cyclohexanol and methyl-cyclohexanol to the action of gaseous chlorine in the presence of benzoylperoxide under the influence of ultraviolet rays at temperatures between 20° C. and 100° C.

References Cited in the file of this patent

UNITED STATES PATENTS

| Number | Name | Date |
|---|---|---|
| 1,761,475 | Gubelman et al. | June 3, 1930 |
| 2,338,445 | Laucht | Jan. 4, 1944 |
| 2,370,342 | Zellner | Feb. 27, 1945 |
| 2,446,681 | Bruson et al. | Apr. 12, 1949 |
| 2,583,425 | Hawley | Jan. 22, 1952 |

OTHER REFERENCES

Beilstein, Organische Chemie, vol. 7 (4th ed., 1931), page 8.